A. C. PERKINS.
LITTER CARRIER.
APPLICATION FILED NOV. 8, 1920.
1,392,594.
Patented Oct. 4, 1921.
2 SHEETS—SHEET 2.
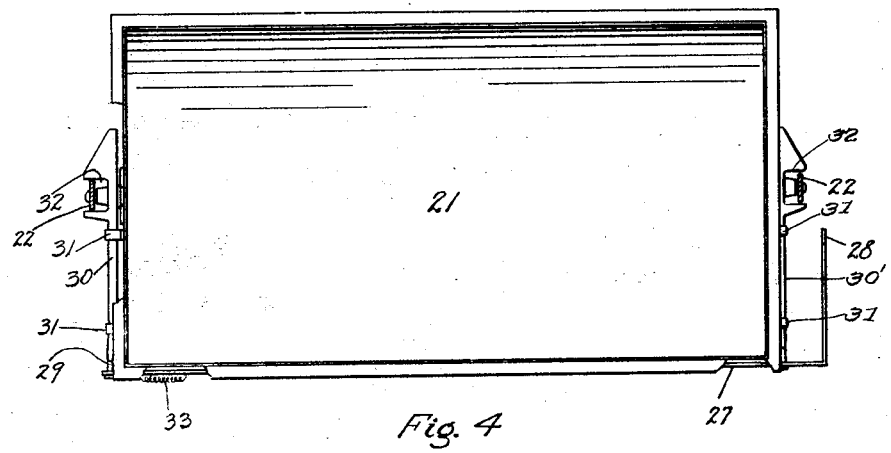
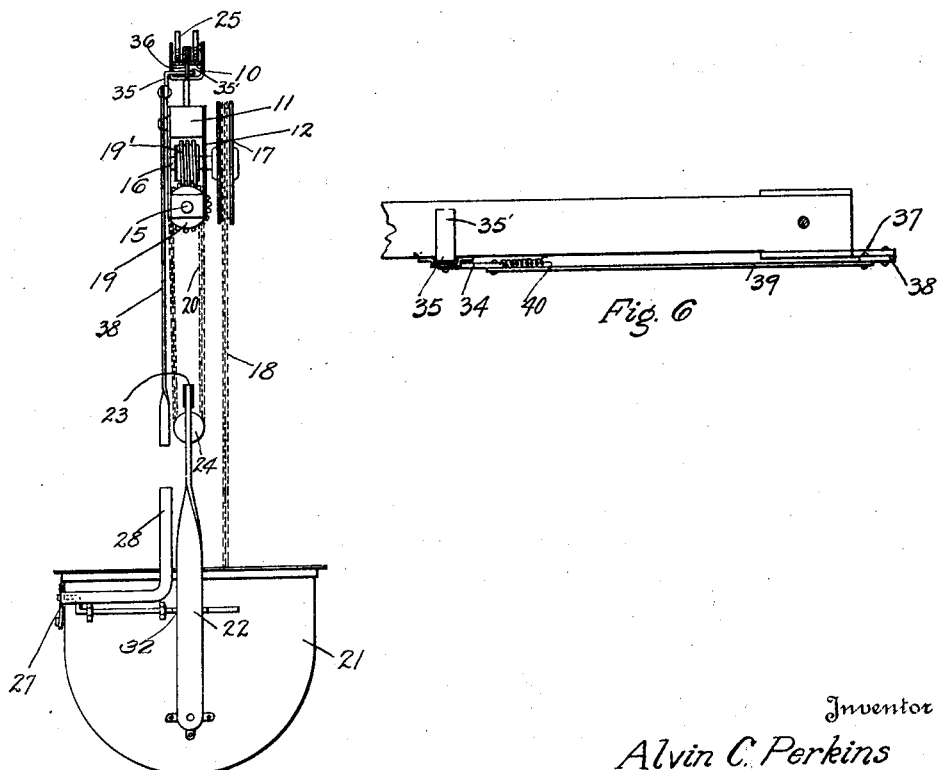
Inventor
Alvin C. Perkins
By
Attorneys

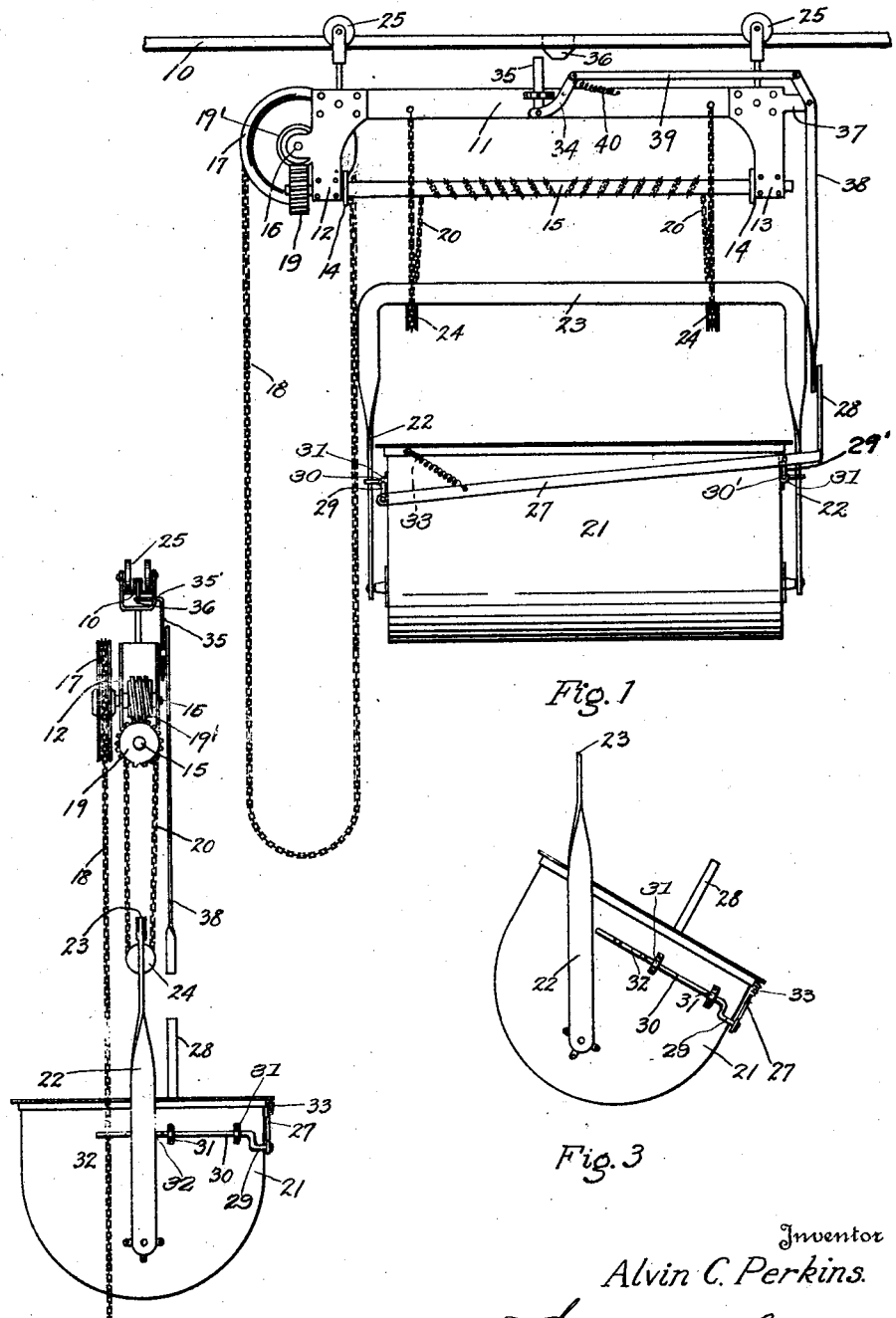

UNITED STATES PATENT OFFICE.

ALVIN C. PERKINS, OF GOODLAND, INDIANA, ASSIGNOR OF ONE-HALF TO LEE R. PERKINS, OF GOODLAND, INDIANA.

LITTER-CARRIER.

1,392,594.  Specification of Letters Patent.  Patented Oct. 4, 1921.

Application filed November 8, 1920. Serial No. 422,578.

*To all whom it may concern:*

Be it known that I, ALVIN C. PERKINS, a citizen of the United States, residing at Goodland, in the county of Newton, State of Indiana, have invented certain new and useful Improvements in Litter - Carriers; and I do hereby declare the following to be a full, clear, and exact description of the invention, such as will enable others skilled in the art to which it appertains to make and use the same.

This invention relates to new and useful improvements in elevated carriers, and particularly to carriers for conveying litter from stables and barns.

One object of the present invention is to provide a litter carrier which includes improved means for automatically releasing the carrier bucket so that it will easily dump its contents.

Another object is to provide a novel form of latch which engages with the bail of the carrier bucket, and which is automatically released from such engagement when a trip engages with a projection on the overhead track, the latch being arranged to automatically reëngage with the bail after the bucket has been dumped and restored to its proper position.

Other objects and advantages will be apparent from the following description when taken in connection with the accompanying drawings.

In the drawings:

Figure 1 is a side elevation of the carrier, and a portion of the overhead track.

Fig. 2 is an end elevation of the carrier, the track being shown in section, and the latch in closed position.

Fig. 3 is a similar view showing the latch released.

Fig. 4 is a horizontal sectional view through the arms of the bail of the bucket, just above the upper edge of the bucket, to show the position of the latch when in closed or engaged position.

Fig. 5 is an end view of the device viewed from the end opposite to that of Fig. 2.

Fig. 6 is a fragmentary top plan view of the carrier showing the trip mechanism.

Referring particularly to the accompanying drawings, 10 represents an overhead track on which the carrier is suspended, said track being composed of two angle strips, as clearly seen in Fig. 2 of the drawings.

The carrier includes a frame composed of the horizontal metal bar 11 to the opposite ends of which are secured the depending castings 12 and 13, each having a bearing 14 in its end rotatably supporting one end of a winding shaft 15. Mounted on a stub shaft 16, carried by the casting 12, is a large grooved and toothed wheel 17, and engaged in the groove of this wheel, and with the teeth thereof, is an endless chain 18 which is adapted to be drawn by the operator to rotate the wheel. On the end of the shaft 15, adjacent the wheel 17, is a worm wheel 19, which meshes with a worm 19' on the shaft 16, whereby when the wheel 17 is rotated the winding shaft 15 will be rotated. A pair of chains 20 each has one end secured to the shaft 15, and the other end secured to the bar 11.

An elongated bucket 21 is disposed below the carrier frame, and pivotally connected to the opposite ends of the bucket are the arms 22 of the bail 23. Secured to the lower side of the transverse portion of the bail 23 are the pulleys 24, and engaged with these pulleys are the intermediate portions of the chains 20. Thus, when the wheel 17 is rotated, and this movement communicated to the shaft 15, the chains 20 will be wound on said shaft, or unwound therefrom, with the result that the bucket will be raised or lowered, in accordance with the direction of rotation of the wheel 17. Secured to and extending above the castings 12 and 13, are the track engaging wheels 25, the same being mounted in pairs to run on the horizontal flanges of the angle strips of said track, and on opposite sides of the vertical flanges thereof.

On each end of the bucket are mounted the loop brackets 31 in which are rotatably supported the shafts 30 and 30', formed with side recesses 32 in which are received the adjacent portions of the legs of the bail 23, to maintain the bucket in upright position. The forward end of the shaft 30 is formed with a downturned crank arm 29, while the corresponding end of the shaft 30' is formed with an upturned crank arm 29'. Disposed longitudinally of the front of the bucket is a rod 27 having its end portions pivotally connected with the crank arms 29 and 29'

One end of the rod 27 is turned upwardly, as shown at 28. A coil spring is secured at its ends to the bucket and rod 27 to yieldably hold the rod at one end of its movement and maintain the latch shafts 30 and 30' in operative position for engagement with the arms of the bail.

Pivotally mounted on the intermediate portion of one side of the bar 11 is a vertically disposed bent lever 34 to one end of which is pivotally connected the lower end of a vertical trip bar 35. This trip bar 35 is mounted in guide brackets carried by the bar 11, and has a transverse portion 35' on its upper end for engagement with the block 36 secured to the lower faces of the horizontal portions of the track, said block being beveled in opposite directions, longitudinally of the track, and on its lower face, for the purpose of depressing said trip bar when the portion 35' engages therewith. A bracket 37 is mounted on the outer end face of the casting 13, and pivotally supported in this bracket is a vertical lever 38, the upper end of said lever being pivotally connected with the other end of the bent lever 34, by means of the link 39, which extends longitudinally over the bar 11 of the bucket carrier frame. The lower end of the lever 38 is disposed inwardly of the upper end of the arm 28 of the slidable rod 27, in such position that when the lever 38 is rocked on its pivot the same lower end will engage with the arm 28 and move the rod 27 longitudinally of the bucket. The other end of the rod 27, being connected to the crank 29, will cause the latch member to be rocked in its brackets and out of engagement with the arm of the bail 23. The bucket is thus released and may be easily and quickly tilted and its contents dumped. This releasing of the latch member is automatic in its operation and is accomplished by the engagement of the trip bar 35 with the block 36 on the track. When the portion 35' of the trip bar 35 engages with the beveled face of the block, said trip bar will be depressed with the result that the bent lever 34 will be rocked on its pivot, pulling on the link 39 and rocking the lever 38 into engagement with the arm 28 and sliding the rod 27 in the guide loops 26, and rocking the latch member 30 out of engaged relation to the arm of the bail. When the carrier has passed the block 36, a coil spring 40, connected to the bar 11 and to the lever 34, restores the parts to normal position, the spring 33, however, restoring the rod 27, and trip bar 35 to their normal positions.

It will be noted that the chains are wound on the shaft 15 in opposite directions so that when the shaft is rotated in one direction they will unwind from the shaft and lower the bucket so that the same can be loaded. When the bucket is loaded the chain 18 is manipulated to wind the chains 20 on the shaft 15 and raise the bucket. The carrier is then moved along the track to the point of dumping, when the trip lever or bar 35 will engage the block 36 and release the notched portions 32 of the shafts 30 and 30' from the arms of the bail. The bucket is then tilted to dump its contents, and the chain 18 again manipulated to raise the bucket, after the same has been swung up by hand, into level position and the latches reëngaged with the arms of the bail.

What is claimed is:

1. In a latch releasing mechanism for an elevated carrier bucket, the combination with a track having a beveled projection, and a bucket suspended from the track by a bail pivoted to said bucket, of a rod slidably mounted on one side of the bucket, a latch carried by one end of the bucket and normally engaged with the bail, and means operable upon engagement with said beveled projection for moving said rod to disengage the latch from the bail.

2. In a latch releasing mechanism for an elevated carrier bucket, the combination with a bucket having a pivoted bail, a track carried projection, a vertically sildable trip bar arranged to be depressed upon engagement with the track projection, a lever pivotally supported above the bucket and pivotally connected to the trip bar, a slidable rod mounted on the bucket, a latch member releasably engaged with the pivoted bail and mounted for rocking movement on the bucket, and an operating lever connected to the said pivoted lever and movable to engage with and move the sliding rod, and connections between the sliding rod and the latch member.

3. The combination with an elevated track and a carrier mounted for movement thereon and having a pivoted bail supported bucket, of a slidable rod mounted on the bucket and having a vertical arm on one end, a rockable latch member having means for engagement with the bail, a crank on the latch member and connected with the slidable rod, a lever pivoted on the carrier, a vertically slidable trip rod mounted on the carrier for engagement with a projection on the track, and movably connected with the first lever, a vertical lever pivotally mounted on the carrier and in position to engage with the arm of the slidable rod to move the same, resilient means between the bucket and the slidable rod, resilient means between the first lever and the carrier, and a link connected to the first lever and the vertical lever.

In testimony whereof, I affix my signature, in the presence of two witnesses.

ALVIN C. PERKINS.

Witnesses:
ALBERT S. PERKINS,
MORT KILGORE.